(12) United States Patent
Kezobo et al.

(10) Patent No.: US 11,936,311 B2
(45) Date of Patent: Mar. 19, 2024

(54) CONTROLLER FOR MOTOR

(71) Applicant: Mitsubishi Electric Corporation, Tokyo (JP)

(72) Inventors: Isao Kezobo, Tokyo (JP); Masahiko Orii, Tokyo (JP); Tatsuya Mori, Tokyo (JP); Seiji Sawada, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 17/426,351

(22) PCT Filed: May 30, 2019

(86) PCT No.: PCT/JP2019/021482
§ 371 (c)(1),
(2) Date: Jul. 28, 2021

(87) PCT Pub. No.: WO2020/213178
PCT Pub. Date: Oct. 22, 2020

(65) Prior Publication Data
US 2022/0103102 A1    Mar. 31, 2022

(30) Foreign Application Priority Data

Apr. 18, 2019 (JP) ................. 2019-079013

(51) Int. Cl.
*H02P 21/05* (2006.01)
*H02P 21/14* (2016.01)
*H02P 21/20* (2016.01)

(52) U.S. Cl.
CPC ............ *H02P 21/05* (2013.01); *H02P 21/141* (2013.01); *H02P 21/20* (2016.02)

(58) Field of Classification Search
CPC ........ H02P 21/05; H02P 21/141; H02P 21/20; H02P 6/10
(Continued)

(56) References Cited

U.S. PATENT DOCUMENTS

2009/0267550 A1    10/2009   Hida et al.
2016/0013738 A1    1/2016    Hozuki et al.
(Continued)

FOREIGN PATENT DOCUMENTS

CN    108352797 A    7/2018
JP    2009-124871 A    6/2009
(Continued)

OTHER PUBLICATIONS

Ichiki 2009240042 A (Motor Control Apparatus and Motor Control Method) Date Published Oct. 15, 2009 (Year: 2009).*
(Continued)

*Primary Examiner* — Jorge L Carrasquillo
(74) *Attorney, Agent, or Firm* — Sughrue Mion, PLLC; Richard C. Turner

(57) ABSTRACT

To provide a controller for motor which can reduce a torque ripple up to high frequency, without amplifying unnecessary noise and vibration. A controller for motor estimates an interlinkage flux based on the applied voltage and the detection value of current; estimates an output torque based on the detection value of current and the estimation value of interlinkage flux; extracts a pulsation component from the estimation value of output torque; calculates a voltage command correction value based on the extraction value of pulsation component; calculates a voltage command after superimposing by superimposing the voltage command correction value on the voltage command basic value; and applies voltage to winding based on the voltage command after superimposing.

7 Claims, 8 Drawing Sheets

(58) Field of Classification Search
USPC .................................................. 318/400.02
See application file for complete search history.

(56) References Cited

U.S. PATENT DOCUMENTS

| | | | | |
|---|---|---|---|---|
| 2018/0309398 A1* | 10/2018 | Kitou | ....................... | H02P 21/05 |
| 2019/0229659 A1 | 7/2019 | Tadano et al. | | |
| 2020/0304050 A1 | 9/2020 | Tadano et al. | | |

FOREIGN PATENT DOCUMENTS

| | | | |
|---|---|---|---|
| JP | 2009124871 A | * | 6/2009 |
| JP | 2009-268267 A | | 11/2009 |
| JP | 2010-41867 A | | 2/2010 |
| JP | 2010041867 A | * | 2/2010 |
| JP | 2011-176950 A | | 9/2011 |
| JP | 2012-005269 A | | 1/2012 |
| JP | 2015-012770 A | | 1/2015 |
| JP | 2015-012771 A | | 1/2015 |
| JP | 2018-007287 A | | 1/2018 |
| WO | 2014/167667 A1 | | 10/2014 |

OTHER PUBLICATIONS

Hida et al.(JP 2011050178 A) Motor Control Device and Generator Control Device Date Published Mar. 10, 2011 (Year: 2011).*
Fujii et al.(JP 2010041867 A) (Control Device for Multiphase Rotary Electric Machine) Date Published Feb. 18, 2010 (Year: 2010).*
Chinese Office Action dated Aug. 31, 2023 in Application No. 201980095099.9.
Extended European Search Report dated Apr. 21, 2022, issued in European Application No. 19924899.8.
Office Action issued from Japanese Patent Application No. 2019-079013 dated Aug. 6, 2019.
International Search Report for PCT/JP2019/021482 dated Aug. 6, 2019 (PCT/ISA/210).

* cited by examiner

CONTROLLER FOR MOTOR

CROSS REFERENCE TO RELATED APPLICATIONS

This application is a National Stage of International Application No. PCT/JP2019/021482 filed May 30, 2019, claiming priority based on Japanese Patent Application No. 2019-079013 filed Apr. 18, 2019.

TECHNICAL FIELD

The present disclosure is related with a controller for motor.

BACKGROUND ART

The motor outputs a torque according to the interlinkage flux interlinked to the winding of the motor, and the current which flows into the winding. However, in many motors, since the interlinkage flux pulsates synchronizing with the rotational angle of the motor, the output torque pulsates synchronizing with the rotational angle. In order to suppress this kind pulsation of output torque, there are various apparatus previously.

As the example of the conventional apparatus, like PLT 1, the interlinkage flux is estimated by integrating a voltage obtained by subtracting the voltage drop amount of the winding resistor from the applied voltage; the pulsation of torque is estimated by calculating the inner product of the estimated interlinkage flux and the winding current; the current correction value is calculated by multiplying the gain to the pulsation of torque; and the current command is corrected by the current correction value.

As the other example of the conventional apparatus, like PLT 2, the induced voltage is estimated by performing the inverse operation of the voltage equation of the motor; the torque is estimated based on the induced voltage; the torque ripple component is extracted by Fourier-transforming the estimated torque at the frequency of the torque ripple; and the torque correction value is calculated and fed back to the torque command.

CITATION LIST

Patent Literature

PLT 1: JP 2009-268267 A
PLT 2: WO 2014/167667 A

SUMMARY OF INVENTION

Technical Problem

In the apparatus like PLT 1, although the estimation of output torque is possible up to high frequency, since the correction value is fed back to the current command, there is a response delay from the current command to the current which actually flows into the motor, the applied voltage of the motor cannot be corrected up to sufficiently high frequency, and the torque ripple of high frequency cannot be reduced. Moreover, unnecessary noise and vibration are included in the estimated torque ripple, and since this is amplified and fed back as the current correction value, noise and vibration included in current and torque of the motor are amplified.

In the apparatus like PLT 2, since the estimation of the induced voltage includes the differentiation of current which performs the inverse operation of the voltage equation which expresses the response from the induced voltage of the motor to the current, the high frequency component is superimposed and the high frequency component is reduced using the low pass filter. Accordingly, the induced voltage and the output torque cannot be estimated up to sufficiently high frequency, and the torque ripple of high frequency cannot be reduced.

And, since the estimated torque ripple component is fed back to the torque command, similar to PLT 1, due to the response delay from the torque command to the current which actually flows into the motor, the applied voltage of the motor cannot be corrected up to sufficiently high frequency, and the torque ripple of high frequency cannot be reduced. Although there is a configuration that corrects the voltage command so that pulsation of the induced voltage is reduced and the pulsation of current is reduced, since torque is generated according to the interlinkage flux and the current, the torque ripple cannot be reduced enough, in dealing with the problem that the interlinkage flux ripples. In the case of the system which estimates the induced voltage in order to estimate the interlinkage flux and the output torque, other than using the low pass filter as mentioned above, there is the case where an estimator like the observer is used. But, in this case, the frequency of the torque which can be estimated is upper-limited by the response frequency decided by the gain and the filter which exist in the observer, and high frequency cannot be estimated.

In order to solve the above problems, the present disclosure aims at reducing the torque ripple up to high frequency, without amplifying unnecessary noise and vibration.

Solution to Problem

A controller for motor according to the present disclosure including:
  a basic voltage command calculation unit that calculates a voltage command basic value;
  a current detection unit that detects a current flowing through a winding of a motor;
  a magnetic flux estimation unit that estimates an interlinkage flux interlinked to the winding, based on an applied voltage applied to the winding and a detection value of the current;
  a torque estimation unit that estimates an output torque of the motor, based on the detection value of the current and an estimation value of the interlinkage flux;
  a pulsation extraction unit that extracts a pulsation component from an estimation value of the output torque;
  a pulsation control unit that calculates a voltage command correction value, based on an extraction value of the pulsation component;
  a superimposing unit that calculates a voltage command after superimposing by superimposing the voltage command correction value on the voltage command basic value; and
  a voltage application unit that applies voltage to the winding, based on the voltage command after the superimposing.

Advantage of Invention

According to the controller for motor of the present disclosure, since the interlinkage flux is estimated based on the detection value of current and the applied voltage, and the output torque is estimated based on the detection value of current and the estimation value of interlinkage flux, the interlinkage flux and the output torque can be estimated up to high frequency, while suppressing amplification of unnecessary noise and vibration. Since the pulsation component is extracted from the estimation value of output torque, and the voltage command correction value is calculated, the influence of unnecessary noise and vibration can be reduced. Then, since the voltage command value correction value can correct the voltage command directly, the torque ripple can be reduced up to high frequency, without being influenced by the response delay of the current feedback control system.

DETAILED DESCRIPTION OF THE EMBODIMENTS

1. Embodiment 1

Figure 1:
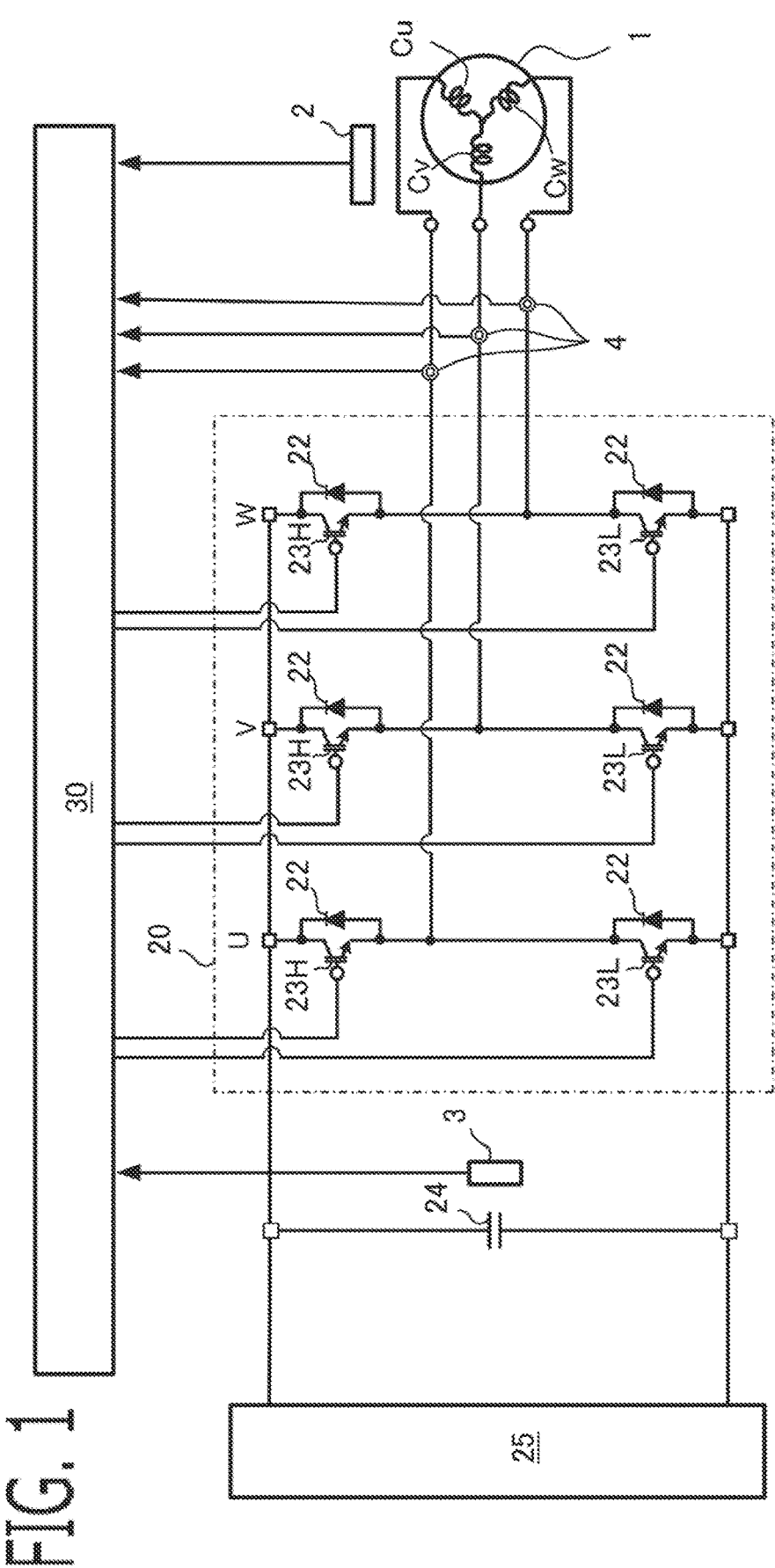
FIG. 1 is a schematic configuration diagram of the motor and the controller for motor according to Embodiment 1.

A controller 30 for motor (hereinafter, referred to simply as the controller 30) according to Embodiment 1 will be explained with reference to the drawings. FIG. 1 is a schematic configuration diagram of a motor 1, an inverter 20, and the controller 30 according to the present embodiment.

1-1. Motor

The motor 1 is a permanent magnet synchronous motor which is provided with a stator having three-phase windings Cu, Cv, Cw of U phase, V phase, and W phase, and a rotor having permanent magnet. The stator is provided with the three-phase windings Cu, Cv, Cw. The three-phase windings Cu, Cv, Cw are connected by star connection. The three-phase windings may be connected by Δ connection.

The motor 1 is provided with a rotation angle sensor 2 which outputs an electric signal according to a rotational angle of the rotor. The rotation angle sensor 2 is a Hall element, an encoder, or a resolver. An output signal of the rotation angle sensor 2 is inputted into the controller 30.

1-2. Inverter

The inverter 20 is provided with a plurality of switching devices and performs a DC/AC conversion between a DC power source 25 and the three-phase windings. The inverter 20 is provided with three sets of a series circuit. (leg) where a positive electrode side switching device 23H (upper arm) connected to the positive electrode side of the DC power source 25 and a negative electrode side switching device 23L (lower arm) connected to the negative electrode side of the DC power source 25 are connected in series, corresponding to respective phase of the three-phase windings. The inverter 20 is provided with a total of six switching devices of the three positive electrode side switching devices 23H, and the three negative electrode side switching devices 23L. Then, a connection node where the positive electrode side switching device 23H and the negative electrode side switching device 23L are connected in series is connected to the winding of the corresponding phase.

IGBT (Insulated Gate Bipolar Transistor) in which a diode 22 is connected in inverse parallel, MOSFET (Metal Oxide Semiconductor Field Effect Transistor) which has a function of diode connected in inverse parallel, or the like is used for the switching device. A gate terminal of the each switching device is connected to the controller 30. The each switching device is turned on or turned off by the control signal outputted from the controller 30.

A smoothing capacitor 24 is connected between the positive electrode side and the negative electrode side of the inverter 20. A voltage sensor 3 outputs an electric signal according to a DC voltage of the DC power source 25. The output signal of the voltage sensor 3 is inputted into the controller 30.

A current sensor 4 outputs an electric signal according to current which flows into the winding of each phase. The current sensor 4 is provided on the each phase wire which connects the series circuit of the switching devices and the winding. An output signal of the current sensor 4 is inputted into the controller 30.

A chargeable and dischargeable electricity accumulation device (for example, a lithium ion battery, a nickel hydride battery, an electrical double layer capacitor) is used for the DC power source 25. A DC-DC converter which is a DC electric power converter which steps up or steps down the DC voltage may be provided in the DC power source 25.

1-3. Controller

Figure 2:
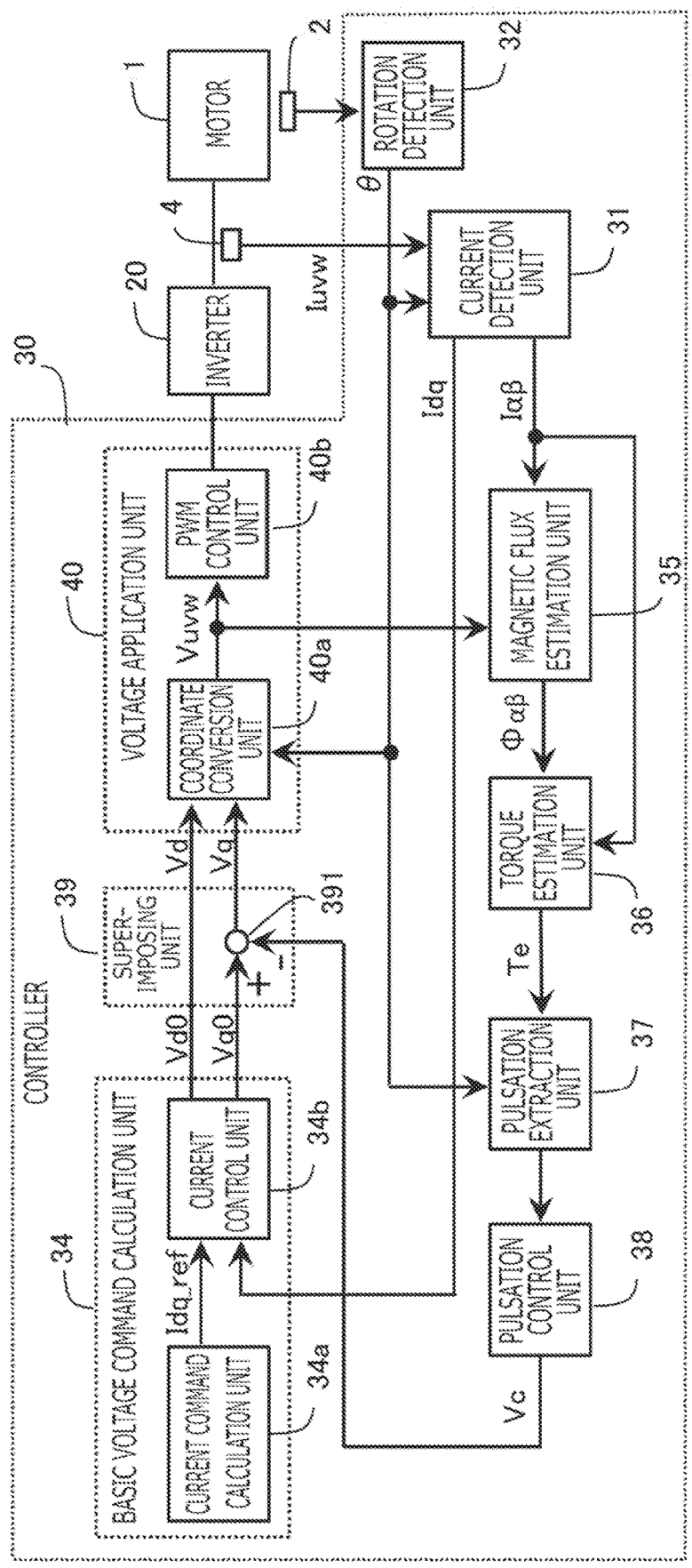
FIG. 2 is a schematic block diagram of the controller for motor according to Embodiment 1.
Figure 3:
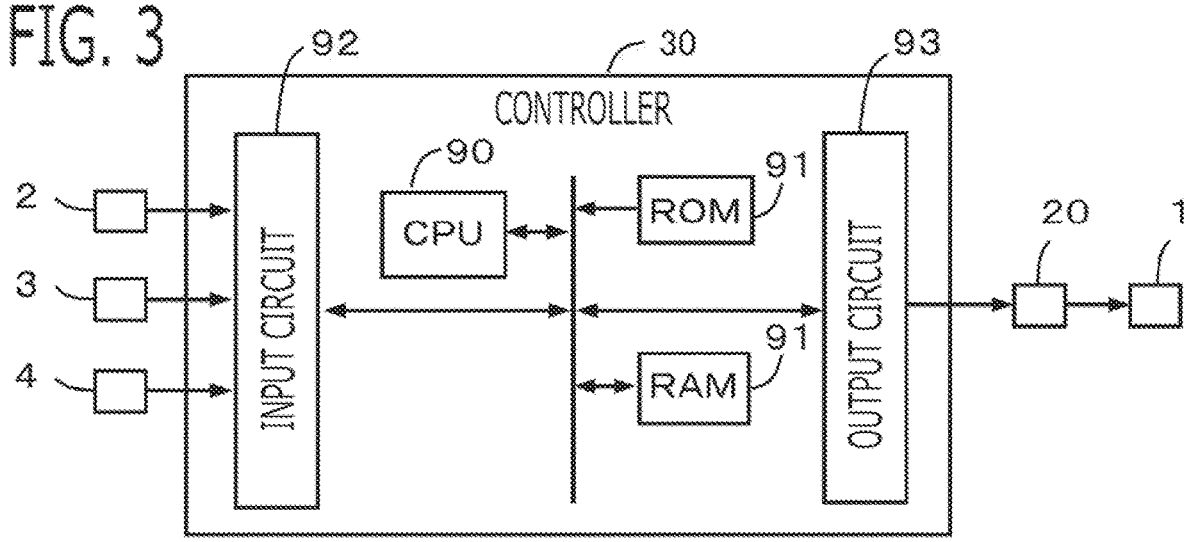
FIG. 3 is a hardware configuration diagram of the controller for motor according to Embodiment 1.

The controller 30 controls the motor 1 by controlling the inverter 20. As shown in FIG. 2, the controller 30 is provided with a current detection unit 31, a rotation detection unit 32, a voltage detection unit 33, a basic voltage command calculation unit. 34, a magnetic flux estimation unit 35, a torque estimation unit 36, a pulsation extraction unit 37, a pulsation control unit 38, a superimposing unit 39, a voltage application unit 40, and the like. Each function of the controller 30 is realized by processing circuits provided in the controller 30. Specifically, as shown in FIG. 3, the controller 30 is provided with, as a processing circuit, an arithmetic processor (computer) 90 such as a CPU (Central Processing Unit), storage apparatuses 91 that exchange data with the arithmetic processor 90, an input circuit. 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a PAM (Random Access Memory) which can read data and write data from the arithmetic processor 90, a ROM (Read Only Memory) which can read data from the arithmetic processor 90, and the like. The input circuit 92 is connected with various kinds of sensors and switches such as the rotation angle sensor 2, the voltage sensor 3, and the current sensor 4, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 40 of FIG. 2 provided in the controller 30 are realized. Setting data items such as a control gain Kv, a rotation order n, and a dead time ΔTd to be used in the control units 31 to 40 are stored, as part of software items (programs), in the storage apparatus 91 such as a ROM. Each function of the controller 30 will be described in detail below.

1-3-1. Each Detection Unit

The rotation detection unit 32 detects a rotational angle θ of the rotor (a magnetic pole position). In the present embodiment, the rotation detection unit 32 detects the rotational angle θ of the rotor (the magnetic pole position) in an electrical angle, based on the output signal of the rotation angle sensor 2.

The voltage detection unit 33 detects a power source voltage VDC of the DC power source 25. In the present embodiment, the voltage detection unit 33 detects the power source voltage VDC based on the output signal of the voltage sensor 3.

The current detection unit 31 detects winding currents Iu, Iv, Iw which flow into the three-phase windings. In the present embodiment, the current detection unit 31 detects currents Iu, Iv, Iw which flow into the respective phase windings Cu, Cv, Cw from the inverter 20, based on the output signal of the current sensor 4. Herein, a vector which consists of the detection value of U phase current Iu, the detection value of V phase current Iv, and the detection value of W phase current Iw is defined as a three-phase current detection value Iuvw.

The current detection unit 31 calculates a detection value of α-axis current Iα, and a detection value of β-axis current IQ, by performing a three-phase/two-phase conversion to the three-phase current detection value Iuvw. Herein, a vector which consists of the detection value of α-axis current Iα and the detection value of β-axis current Iβ is defined as an αβ-axis current detection value Iαβ. Then, the current detection unit 31 calculates a detection value of d-axis current Id and a detection value of q-axis current Iq, by performing a rotating coordinate conversion to the αβ-axis current detection value Iαβ, based on the magnetic pole position θ. Herein, a vector which consists of the detection value of d-axis current Id and the detection value of q-axis current Iq is defined as a dq-axis current detection value Idq.

The α-axis is defined in the direction of U phase winding, and the β-axis is defined in the direction advanced to the α-axis by 90 degrees (π/2) in the electrical angle. The d-axis is defined in the direction of the N pole (the magnetic pole position) of the permanent magnet provided in the rotor, and the q-axis is defined in the direction advanced to d-axis by 90 degrees (π/2) in the electrical angle.

1-3-2. Basic Voltage Command Calculation Unit

The basic voltage command calculation unit 34 calculates a voltage command basic value. In the present embodiment, the basic voltage command calculation unit 34 calculates a voltage command basic value of d-axis Vd0 and a voltage command basic value of q-axis Vq0, as the voltage command basic value. Herein, a vector which consists of the voltage command basic value of d-axis Vd0 and the voltage command basic value of q-axis Vq0 is defined as a dq-axis voltage command basic value Vdq0.

The basic voltage command calculation unit 34 is provided with a current command calculation unit 34a and a current control unit 34b. The current command calculation unit 34a calculates a current command of d-axis Id_ref and a current command of q-axis Iq_ref. Herein, a vector which consists of the current command of d-axis Id_ref and the current command of q-axis Iq_ref is defined as a dq-axis current command Idq_ref. Well-known current vector control methods, such as the maximum torque/current control, the magnetic flux weakening control, and the Id=0 control, are used for calculation of this dq-axis current command Idq_ref.

The current control unit 34b calculates a current deviation between the dq-axis current command Idq_ref and the dq-axis current detection value Idq, and calculates a dq-axis voltage command basic value Vdq0, by performing a control calculation, such as a PID control, based on the current deviation.

1-3-3. Magnetic Flux Estimation Unit

The magnetic flux estimation unit 35 estimates an interlinkage flux interlinked to the winding, based on the applied voltage applied to the winding and the detection value of current. In the present embodiment, the magnetic flux estimation unit 35 calculates an estimation value of αβ-axis interlinkage flux Φαβ which expresses the interlinkage flux in the coordinate system of αβ-axis.

The calculation principle will be explained. The voltage equation which is expressed in the coordinate system of αβ-axis is a next equation. Herein, αβ-axis applied voltage Vαβ is a vector which consists of an applied voltage of α-axis Vα, and an applied voltage of β-axis Vβ. The αβ-axis interlinkage flux Φαβ is a vector which consists of an interlinkage flux of α-axis Φα, and an interlinkage flux of β-axis Φβ. R is a resistance value of the winding.

$$V\alpha\beta = R \cdot I\alpha\beta + \frac{d}{dt}\Phi\alpha\beta \qquad (1)$$

As shown in the equation (1), the αβ-axis applied voltage Vαβ is equal to a total value of a voltage drop R×Iαβ obtained by multiplying the resistance value R of the winding and the αβ-axis current Iαβ, and an electromotive voltage obtained by time-differentiating the αβ-axis interlinkage flux Φαβ.

Herein, as shown in a next equation, the αβ-axis interlinkage flux Φαβ consists of a total value of a magnetic flux component of inductance L×Iαβ obtained by multiplying an inductance L of the armature and the αβ-axis current Iαβ, and the αβ-axis magnet interlinkage flux Φmαβ which is an interlinkage flux of αβ-axis by the magnet of the rotor.

$$\Phi\alpha\beta = L \cdot I\alpha\beta + \Phi m\alpha\beta \qquad (2)$$

If the equation (2) is substituted for the interlinkage flux Φαβ of the equation (1), it is found that the equation (1) also includes a term of the differentiation of current Iαβ. The electromotive voltage by the time differential of the magnet interlinkage flux Φmαβ is the so-called induced voltage. That is to say, it can be said that the voltage equation expresses a response from the applied voltage and the induced voltage to the current flowing into the winding.

On the other hand, a next equation is obtained if the both sides of the equation (1) are integrated and rearranged. That is to say, the αβ-axis interlinkage flux Φαβ can be calculated by an integral value of the αβ-axis applied voltage Vαβ, and an integral value of the αβ-axis current Iαβ.

$$\Phi\alpha\beta = \int (V\alpha\beta - R \cdot I\alpha\beta) \, dt = \int V\alpha\beta \, dt - R \int I\alpha\beta \, dt \quad (3)$$

In the present embodiment, the magnetic flux estimation unit 35 calculates an estimation value of αβ-axis interlinkage flux Φαβ, based on the integral value of αβ-axis applied voltage Vαβ, and the integral value of αβ-axis current detection value Iαβ. Specifically, the magnetic flux estimation unit 35 calculates using the equation (3). The magnetic flux estimation unit 35 calculates the applied voltage of α-axis Vα and the applied voltage of β-axis Vβ, by performing an three-phase/two-phase conversion to three-phase voltage commands Vu, Vv, Vw which are calculated by the voltage application unit 40 described below.

1-3-4. Torque Estimation Unit

The torque estimation unit 36 estimates an output torque Te of the motor, based on the detection value of current, and the estimation value of interlinkage flux.

In the present embodiment, the torque estimation unit 36 calculates an estimation value of output torque Te, based on a multiplication value of the estimation value of interlinkage flux and the detection value of current. As shown in a next equation, the torque estimation unit 36 calculates the estimation value of output torque Te by an outer product (vector product) of the estimation value of αβ-axis interlinkage flux Φαβ, and the αβ-axis current detection value Iαβ.

$$Te = \Phi\alpha \cdot I\beta - \Phi\beta \cdot I\alpha \quad (4)$$

1-3-5. Pulsation Extraction Unit

The pulsation extraction unit 37 extracts a pulsation component from the estimation value of output torque Te. The pulsation extraction unit 37 extracts a component of a pulsation frequency of a preliminarily set rotation order n from the estimation value of output torque Te. Herein, the pulsation frequency of the rotation order n becomes a n times frequency of the rotational frequency of the rotor in the electrical angle.

In the present embodiment, the pulsation extraction unit 37 calculates Fourier coefficients an, bn of a cosine wave and a sine wave, by Fourier-transforming the estimation value of output torque Te at the pulsation frequency of the preliminarily set rotation order n, based on the rotational angle θ of the motor, and calculates the Fourier coefficients an, bn of the cosine wave and the sine wave, as an extraction value of the pulsation component.

Herein, Fourier transform will be explained. A next equation is obtained if Fourier series expansion of the estimation value of output torque Te is performed.

$$Te = \frac{a0}{2} + \sum_{m=1}^{\infty} (am \cdot \cos(m \cdot \theta) + bm \cdot \sin(m + \theta)) \quad (5)$$

If the cosine wave of the pulsation frequency of the rotation order n is multiplied to the equation (5), and the well-known Fourier transform which integrates in a period of the rotation order 1 is performed, Fourier coefficient an of the cosine wave of the rotation order n can be calculated.

$$\begin{aligned} an &= 2\frac{1}{2\pi} \int_{-\pi}^{\pi} \left\{ \frac{a0}{2} + \sum_{m=1}^{\infty} (am \cdot \cos(m \cdot \theta) + bm \cdot \sin(m \cdot \theta)) \right\} \cos(n \cdot \theta) d\theta \\ &= \frac{1}{2\pi} \int_{-\pi}^{\pi} 2 \cdot Te \cdot \cos(n \cdot \theta) d\theta \end{aligned} \quad (6)$$

Similarly, if the sine wave of the pulsation frequency of the rotation order n is multiplied to the equation (5), and the well-known Fourier transform which integrates in a period of the rotation order 1 is performed, Fourier coefficient bn of the sine wave of the rotation order n can be calculated.

$$\begin{aligned} bn &= 2\frac{1}{2\pi} \int_{-\pi}^{\pi} \left\{ \frac{a0}{2} + \sum_{m=1}^{\infty} (am \cdot \cos(m \cdot \theta) + bm \cdot \sin(m \cdot \theta)) \right\} \sin(n \cdot \theta) d\theta \\ &= \frac{1}{2\pi} \int_{-\pi}^{\pi} 2 \cdot Te \cdot \sin(n \cdot \theta) d\theta \end{aligned} \quad (7)$$

Figure 4:
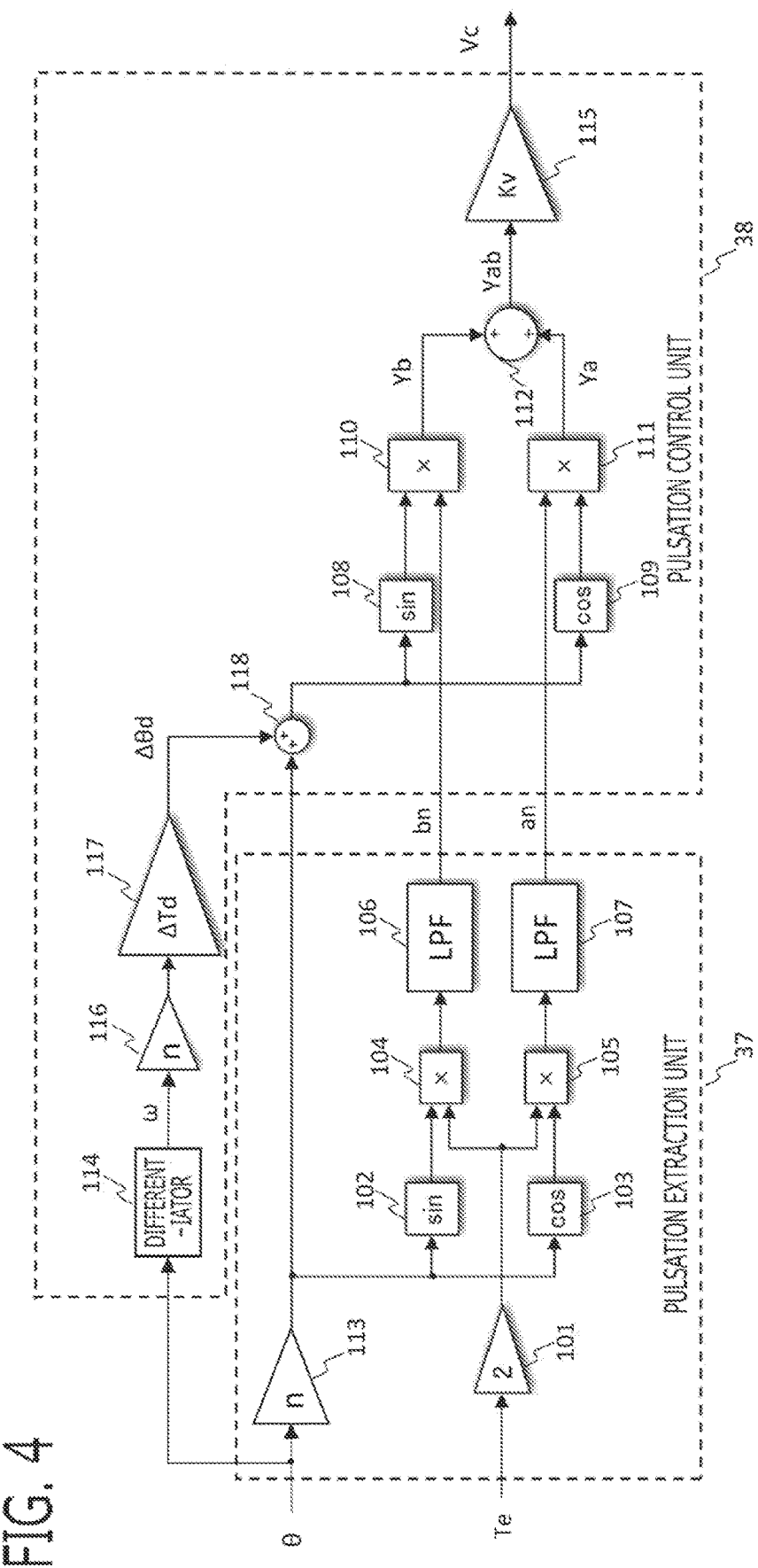
FIG. 4 is a block diagram of the pulsation extraction unit and the pulsation control unit according to Embodiment 1.

Then, as shown in FIG. 4, the pulsation extraction unit 37 calculates the Fourier coefficient an of the cosine wave by performing Fourier transform that multiplies 2 and the cosine wave of the rotation order n to the estimation value of output torque Te, and performs a low pass filter processing (LPF) to this multiplication value. And, the pulsation extraction unit 37 calculates the Fourier coefficient bn of the sine wave by performing Fourier transform that multiplies 2 and the sine wave of the rotation order n to the estimation value of output torque Te, and performs a low pass filter processing (LPF) to this multiplication value. The low pass filter processing is used instead of the integration processing in the period of the rotation order 1 of the equation (6) and the equation (7). Therefore, the cutoff frequency of the low pass filter processing is set to a frequency higher than the frequency of the rotation order 1 (the rotational angle frequency (the rotational angle speed) ω of the rotor). The cutoff frequency of the low pass filter processing may be changed according to the rotational angle speed ω of the rotor. Alternatively, a moving average processing in the period of the rotation order 1 may be used instead of the low pass filter processing.

The pulsation extraction unit 37 of FIG. 4 will be explained in detail. The estimation value of output torque Te is inputted into a gain 101 which is set to two, and the estimation value of output torque Te is doubled. The rotational angle θ is inputted into a gain 113 which is set to the rotation order n, and the rotational angle θ is multiplied by n. The rotation order n is preliminarily set to a natural number greater than or equal to one. Since the rotational angle θ of FIG. 4 is an angle based on the U phase winding, a rotational angle obtained by adding a phase of the pulsation component to the rotational angle θ may be used instead.

The output value (n times value of the rotational angle nθ) of the gain 113 is inputted into a sine function 102, and the sine wave of the rotation order n is calculated. The output value (n times value of the rotational angle nθ) of the gain 113 is inputted into the cosine function 103, and the cosine wave of the rotation order n is calculated. The output value (sine wave) of the sine function 102 and the output value (double value of the estimation value of output torque 2Te) of the gain 101 are inputted into a multiplier 104, and a multiplication processing of two input values is performed. The output value (cosine wave) of the cosine function 103 and the output value (double value of the estimation value of output torque 2Te) of the gain 101 are inputted into a multiplier 105, and a multiplication processing of two input values is performed. The output value of the multiplier 104 is inputted into a low pass filter (LPF) 106, a low pass filter processing is performed to the input value, and the Fourier coefficient bn of the sine wave is calculated. The output value of the multiplier 105 is inputted into a low pass filter (LPF) 107, a low pass filter processing is performed to the input value, and the Fourier coefficient an of the cosine wave is calculated.

1-3-6. Pulsation Control Unit

The pulsation control unit 38 calculates a voltage command correction value, based on the extraction value of the pulsation component. In the present embodiment, as shown in FIG. 4, the pulsation control unit 38 calculates a cosine wave multiplication value Ya by multiplying a cosine wave of the pulsation frequency of the rotation order n to the Fourier coefficient an of the cosine wave, and calculates a sine wave multiplication value Yb by multiplying a sine wave of the pulsation frequency of the rotation order n to the Fourier coefficient bn of the sine wave. Then, the pulsation control unit 38 calculates a value obtained by multiplying a control gain Kv to a total value Yab of the cosine wave multiplication value Ya and the sine wave multiplication value Yb, as the voltage command correction value Vc.

The total value Yab of the sine wave and the cosine wave becomes a value which restored the pulsation component of only the frequency of the rotation order n, and the noise component of other frequency is removed.

A dead time $\Delta Td$ due to calculation delay exists until the estimation value of interlinkage flux, the estimation value of output torque, the Fourier coefficients, and the voltage command correction value are calculated and reflected on the applied voltage, after detecting the current and the rotational angle. Then, the pulsation control unit 38 calculates a phase delay $\Delta\theta d$ due to calculation delay, based on the rotational angle θ of the motor, and calculates the cosine wave and the sine wave of the pulsation frequency of the rotation order n in which the phase delay $\Delta\theta d$ is compensated.

A magnitude of the control gain Kv is set so that a gain crossover frequency of an open loop characteristics which multiplied a linearly approximated transfer characteristic from the voltage command to the output torque, and the control gain Kv may become larger than the maximum value of pulsation frequency de-sired to be reduced. Since the pulsation frequency is proportional to the rotational speed of the motor, the pulsation frequency at the rated rotational speed of the motor becomes the maximum value of pulsation frequency. In the present embodiment, since the transfer characteristic from the actual output torque to the estimation value of output torque is realized so that there is almost no response delay, the transfer characteristic from the voltage command to the output torque is almost equal to the transfer characteristic from the voltage command to the estimation value of output torque. Accordingly, the extremely remarkable effect that the torque ripple can be suppressed up to the vicinity of the maximum value of pulsation frequency is obtained.

The pulsation control unit 38 of FIG. 4 will be explained in detail. The rotational angle θ is inputted into a differentiator 114, and the rotational angle speed ω is calculated. The output value (the rotational angle speed ω) of the differentiator 114 is inputted into a gain 116 which is set to the rotation order n, and the rotational angle speed ω is multiplied by n. The output value (n times value of the rotational angle speed nω) of the gain 116 is inputted into a gain 117 which is set to a dead time $\Delta Td$ due to calculation delay, and a multiplication processing of the dead time $\Delta Td$ is performed to the n times value of the rotational angle speed nω. The output value of the gain 117 becomes $\Delta Td \times n \times \omega$, and becomes a value obtained by converting the dead time $\Delta Td$ into the phase $\Delta\theta d$ of the vibrational frequency of the rotation order n. The dead time $\Delta Td$ is ret to a natural number times of the period of the carrier wave, for example.

The output value (the n times value of the rotational speed nθ) of the gain 113 and the output value (the phase delay $\Delta\theta d$) of the gain 117 are inputted into an adder 118, the phase delay $\Delta\theta d$ is added to the rotational angle nθ of the rotation order n, and a rotational angle of the rotation order n after phase delay compensation is calculated. By addition of this phase delay $\Delta\theta d$, the phase is advanced by the phase delay 16d and the phase delay is compensated.

The output value (the rotational angle of the rotation order n after phase delay compensation) of the adder 118 is inputted into a sine function 108, and a sine wave of the rotation order n after phase delay compensation is calculated. The output value of the adder 118 is inputted into a cosine function 109, and a cosine wave of the rotation order n after phase delay compensation is calculated. The output value (the sine wave) of the sine function 108 and the output value (the Fourier coefficient bn of the sine wave) of the low pass filter 106 are inputted into a multiplier 110, a multiplication processing of two input values is performed, and the sine wave multiplication value Yb is calculated. The output value (the cosine wave) of the cosine function 109 and the output value (the Fourier coefficient an of the cosine wave) of the low pass filter 107 are inputted into a multiplier 111, a multiplication processing of two input values is performed, and the cosine wave multiplication value Ya is calculated. Then, the output value (the sine wave multiplication value Yb) of the multiplier 110 and the output value (the cosine wave multiplication value Ya) of the multiplier 111 are inputted into an adder 112, two input values are added, and a total value Yab of the sine wave and the cosine wave is calculated. The output value (the total value Yab) of the adder 112 is inputted into a gain 115 which is set to the control gain Kv, the total value Yab is multiplied by the control gain Kv, and the voltage command correction value Vc is calculated.

1-3-7. Superimposing Unit

The superimposing unit 39 calculates a voltage command after superimposing by superimposing the voltage command correction value on the voltage command basic value. In the present embodiment, as shown in FIG. 2, the superimposing unit 39 calculates a voltage command of q-axis after superimposing Vg by superimposing the voltage command correction value Vc on the voltage command basic value of q-axis Vq0, and sets the voltage command basic value of d-axis Vd0 as a voltage command of d-axis after superimposing Vd as it is. By a subtractor 391, the voltage command of q-axis after superimposing Vq is calculated by subtracting the voltage command correction value Vc from the voltage command basic value of q-axis Vq0. A voltage command of dq-axis after superimposing Vdq is a vector which consists of the voltage command of d-axis after superimposing Vd and the voltage command of q-axis after superimposing Vq.

1-3-8. Voltage Application Unit

The voltage application unit 40 applies voltage to the winding, based on the voltage command after superimposing. In the present embodiment, the voltage application unit 40 is provided with a coordinate conversion unit 40a and a PWM control unit 40b.

The coordinate conversion unit 40a calculates three-phase voltage commands Vu, Vv, Vw by performing a fixed coordinate conversion and a two-phase/three-phase conversion to the voltage command of dq-axis after superimposing Vdq based on the magnetic pole position θ.

The PWM control unit 40b compares each of the three-phase voltage commands Vu, Vv, Vw with a carrier wave (a triangular wave) which vibrates with an amplitude of the power source voltage VDC/2 centering on 0 with a carrier frequency, turns on a rectangular pulse wave when the voltage command exceeds the carrier wave, and turns off the rectangular pulse wave when the voltage command is below the carrier wave. The PWM control unit 40b outputs control signals according to the rectangular pulse waves of three-phase to the inverter 20, and turns on and off each switching device of the inverter 20.

1-3-9. Effect

In the magnetic flux estimation unit 35, as shown in the equation (3), the interlinkage flux is directly estimated by the integral value of applied voltage and the integral value of current. Accordingly, the response frequency of estimation is not limited by the low pass filter or the observer, and the interlinkage flux can be estimated with good accuracy up to sufficient high frequency. In the torque estimation unit 36, as shown in the equation (4), the output torque is directly estimated with the multiplication value of the interlinkage flux and the current. Accordingly, the information of the interlinkage flux estimated up to high frequency and the current including the high frequency component is not impaired, and the output torque can be estimated with good accuracy up to sufficient high frequency. Herein, the sufficient high frequency means a frequency higher than the frequency of the pulsation component of the interlinkage flux and the output torque at the rated rotational speed of the motor.

In the pulsation extraction unit 37, the Fourier coefficient of the pulsation frequency of the rotation order n is calculated by Fourier-transforming the estimation value of output torque at the pulsation frequency of the preliminarily set rotation order n. In the pulsation control unit 38, the voltage command correction value Vc is calculated by restoring the torque ripple component of only the pulsation frequency of the rotation order n based on the Fourier coefficient, and amplifying the torque ripple component. Accordingly, the torque ripple component which reduced enough the unnecessary noise and vibration which are included in current and voltage can be fed back, and amplification of the unnecessary noise and vibration can be suppressed.

The voltage command correction value Vc is fed back to the voltage command. Accordingly, it is not influenced by the response delay of the current feedback control system, unlike the case of PLT 1 which feeds back to the current command, and the applied voltage of the motor can be corrected up to high frequency. In the pulsation control unit 38, the control gain Kv is set so that the gain crossover frequency becomes higher than the pulsation frequency of the rotation order n at the rated rotational speed. Accordingly, the torque ripple component can be reduced up to sufficiently high frequency.

In the configuration like PLT 2, since the induced voltage is estimated including the differentiation of current which performs the inverse operation of the voltage equation which expresses the response from the induced voltage of the motor to the current, the high frequency component is superimposed and the high frequency component of the induced voltage is reduced using the low pass filter or the observer. Accordingly, the induced voltage and the output torque cannot be estimated up to sufficiently high frequency, and the torque ripple component of high frequency cannot be reduced.

<Reduction Effect of Torque Ripple Component>

Figure 5:
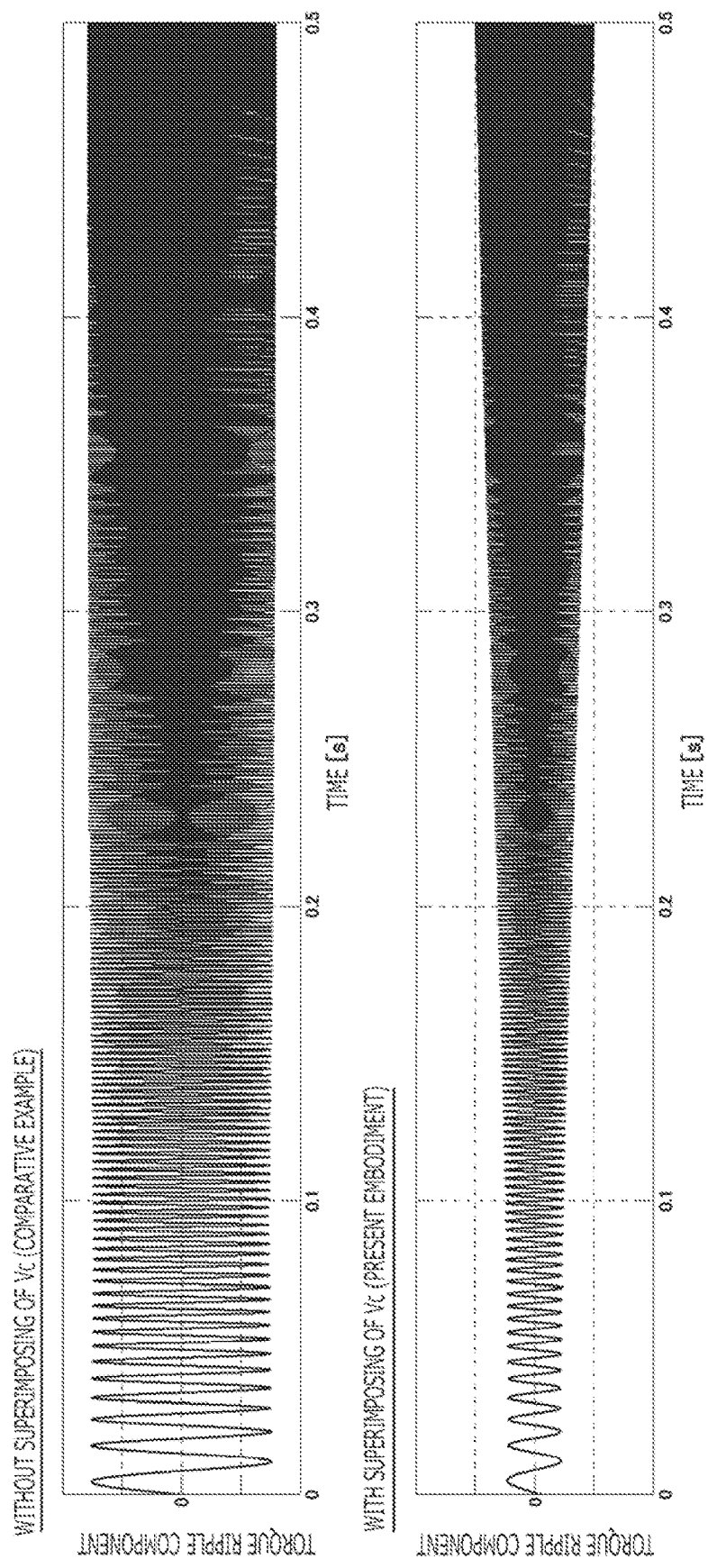
FIG. 5 is a time chart for explaining the reduction effect of the torque ripple component according to Embodiment 1.

The reduction effect of the torque ripple component according to the present embodiment will be explained using FIG. 5. FIG. 5 shows waveforms of the torque ripple component when increasing rotational speed with passage of time so that the pulsation frequency of the rotation order n rises from 50 Hz to 1500 Hz, in the motor whose pulsation frequency of the rotation order n at the rated rotational speed is 1500 Hz. The upper row graph of FIG. 5 shows a comparative example in which the voltage command correction value Vc is not superimposed. The lower row graph of FIG. 5 shows an example of the present embodiment in which the voltage command correction value Vc is superimposed. Compared with the comparative example of the upper row, in the present embodiment of the lower row, it is found that the torque ripple component is reduced. In this example, since the control gain Kv is set so that gain crossover frequency becomes 1500 Hz, the reduction effect of the torque ripple component is deteriorating as the frequency approaches 1500 Hz, but the torque ripple component can be reduced up to 1500 Hz.

<Noise Resistance Performance>

Figure 6:
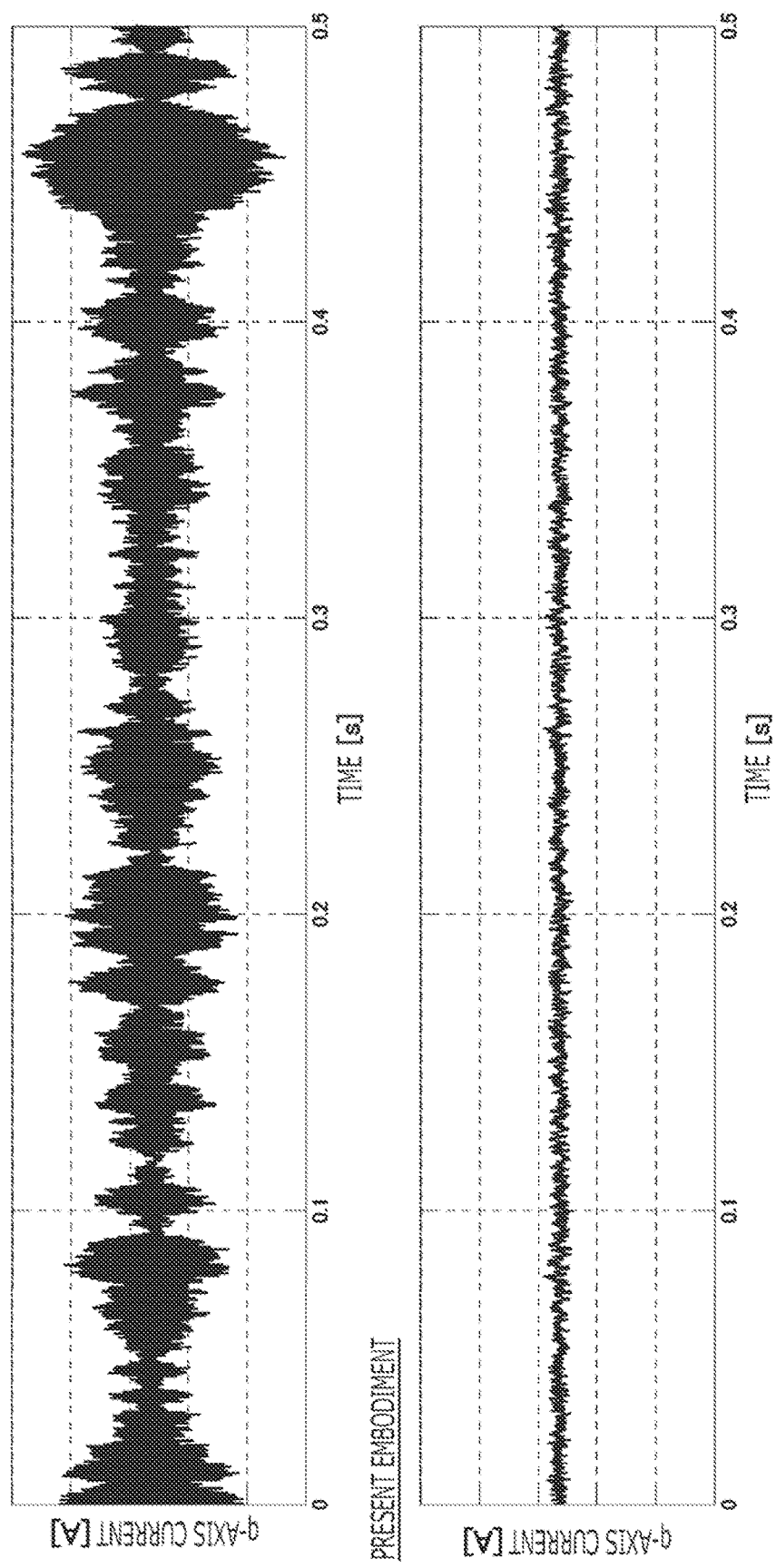
FIG. 6 is a time chart for explaining the noise resistance performance according to Embodiment 1.

Next, the effect of suppressing amplification of the noise and the vibration according to the present embodiment will be explained using FIG. 6. FIG. 6 shows q-axis currents measured under the conditions where the torque ripple does not occur and the random noise is included in the detected current so that the influence of the noise can be easily seen. The upper row graph of FIG. 6 shows a comparative example in which the output torque is estimated without reducing the noise included in current, and the noise included in the estimation value of output torque is amplified and negatively fed back as the voltage command correction value. The lower row graph of FIG. 6 shows an example of the present embodiment in which the output torque is estimated while reducing the influence of the noise included in current, only the component of the pulsation frequency included in the estimation value of output torque is extracted, and the voltage command correction value is calculated. In the upper row graph and the lower row graph, the scale of the vertical axis is the same. In the comparative example of the upper row, the noise of current is significantly amplified compared with the case where the voltage command is not corrected. Since the noise of current is amplified as the magnitude of the control gain is large, reducing the torque ripple component up to sufficiently high frequency and suppressing amplification of the noise of current have a trade-off relation. In the present embodiment of the lower row, the noise of current is not amplified, the magnitude of the control gain Kv can be enlarged, and the torque ripple component can be reduced up to sufficiently high frequency.

According to the present embodiment, since the interlinkage flux is directly estimated from current and voltage without interposing the induced voltage, the interlinkage flux and the output torque can be estimated up to sufficient high frequency. And, since the voltage command correction value which reduces the torque ripple component of the rotation order n is calculated and the voltage command is corrected, without amplifying unnecessary noise and vibration by extracting the component of the pulsation frequency of the rotation order n, the applied voltage of the motor can be corrected up to sufficient high frequency, without receiving restriction of the response delay of the current feedback control system. Therefore, the unconventional remarkable effect that the torque ripple can be reduced up to sufficient high frequency without amplifying unnecessary noise and vibration is obtained.

Since the voltage command of q-axis is corrected by the voltage command correction value Vc and the voltage command of d-axis is not corrected, it is necessary to correct only one voltage command, and the torque ripple can be reduced by simple calculation.

1-3-10. Example of Conversion

In the embodiment mentioned above, the magnetic flux estimation unit 35 calculates the estimation value of $\alpha\beta$-axis interlinkage flux $\Phi\alpha\beta$ which is expressed in the coordinate system of $\alpha\beta$-axis. However, the magnetic flux estimation unit 35 may calculate an estimation value of dq-axis interlinkage flux $\Phi dq$ which is expressed in the coordinate system of dq-axis. In this case, as shown in a next equation, the magnetic flux estimation unit 35 calculates the estimation value of dq-axis interlinkage flux $\Phi dq$, based on an integral value of the dq-axis applied voltage Vdq, and an integral value of the dq-axis current detection value Idq. The magnetic flux estimation unit 35 uses the voltage command of dq-axis after superimposing Vdq which is calculated by the superimposing unit 39, as the dq-axis applied voltage Vdq, and uses the dq-axis current detection value Idq which is calculated by the current detection unit 31. The dq-axis interlinkage flux $\Phi dq$ is a vector which consists of an interlinkage flux of d-axis $\Phi d$, and an interlinkage flux of q-axis q.

$$\Phi dq = \int (Vdq - R \cdot Idq)dt = \int Vdq \, dt - R \int Idq \, dt \qquad (8)$$

In accordance with this, as shown in a next equation, the torque estimation unit 36 may calculate the estimation value of output torque Te by an outer product (vector product) of the estimation value of dq-axis interlinkage flux $\Phi dq$, and the dq-axis current detection value Idq.

$$Te = \Phi d \cdot Iq - \Phi q \cdot Id \qquad (9)$$

2. Embodiment 2

Next, the controller for motor 30 according to Embodiment 2 will be explained. The explanation for constituent parts the same as those in Embodiment 1 will be omitted.

The basic configuration of the controller for motor 30 according to the present embodiment is the same as that of Embodiment 1; however, the configuration of the torque estimation unit 36 is different from that of Embodiment 1.

In the present embodiment, the torque estimation unit 36 uses an estimate equation which can include more pulsation components than Embodiment 1. That is to say, the estimate equation which is configured according to the principle that the generated output torque can be calculated by partially differentiating a magnetic energy by the rotational angle.

Then, the torque estimation unit 36 calculates the estimation value of the output torque, based on a multiplication value of the detection value of the current, and a differential value obtained by differentiating the estimation value of the interlinkage flux by the rotational angle. As shown in the first term and the second term of the right side of the next equation, the torque estimation unit 36 calculates the estimation value of output torque Te by a half value of an inner product of the $\alpha\beta$-axis current detection value $I\alpha\beta$ and a differential value obtained by differentiating the estimation value of $\alpha\beta$-axis interlinkage flux $\Phi\alpha\beta$ by the rotational angle. In the third term and the fourth term of the right side of the next equation, a half value of an inner product of the $\alpha\beta$-axis current detection value $I\alpha\beta$ and a differential value obtained by differentiating the magnet interlinkage flux of $\alpha\beta$-axis $\Phi m\alpha$, $\Phi m\beta$ by the rotational angle is further added. But, if the ratio of the pulsation of magnet interlinkage flux with respect to the total interlinkage flux is small, the third term and the fourth term may be omitted.

$$Te = \frac{1}{2}I\alpha \cdot \frac{d\Phi\alpha}{d\theta} + \frac{1}{2}I\beta \cdot \frac{d\Phi\beta}{d\theta} + \left(\frac{1}{2}I\alpha \cdot \frac{d\Phi m\alpha}{d\theta} + \frac{1}{2}I\beta \cdot \frac{d\Phi m\beta}{d\theta}\right) \qquad (10)$$

Herein, about the angle differential value of the magnet interlinkage flux of $\alpha\beta$-axis $\Phi m\alpha$, $\Phi m\beta$ in the third term and the fourth term, by referring a table data or a function in which a relationship between the angle differential value of the magnet interlinkage flux of $\alpha\beta$-axis $\Phi m\alpha$, $\Phi m\beta$ and the rotational angle is preliminarily set, the torque estimation unit 36 calculates the angle differential value of the magnet interlinkage flux of $\alpha\beta$-axis $\Phi m\alpha$, $\Phi m\beta$ corresponding to the present rotational angle.

Alternatively, as shown in the first term and the second term of the right side of the next equation, the torque estimation unit 36 may calculate the estimation value of output torque Te by an inner product of the $\alpha\beta$-axis current detection value $I\alpha\beta$ and a differential value obtained by differentiating the estimation value of $\alpha\beta$-axis interlinkage flux $\Phi\alpha\beta$ as by the rotational angle. In the third term, the fourth term, and the fifth term of the right side of the next equation, a half value of a secondary form of a differential value obtained by differentiating an inductance of $\alpha\beta$-axis $L\alpha$, $L\beta$, $L\alpha\beta$ by the rotational angle, and the $\alpha\beta$-axis current detection value $I\alpha\beta$ is further subtracted. But, if the ratio of the pulsation of the magnetic flux due to inductance with respect to the total interlinkage flux is small, the third term, the fourth term, and the fifth term may be omitted.

$$Te = \qquad (11)$$
$$I\alpha \cdot \frac{d\Phi\alpha}{d\theta} + I\beta \cdot \frac{d\Phi\beta}{d\theta} - \left(\frac{1}{2}I\alpha^2 \cdot \frac{dL\alpha}{d\theta} + \frac{1}{2}I\beta^2 \cdot \frac{dL\beta}{d\theta} + I\alpha \cdot I\beta \cdot \frac{dL\alpha\beta}{d\theta}\right)$$

Herein, about the angle differential value of inductance of αβ-axis Lα, Lβ, Lαβ in the third term, the fourth term, and the fifth term, by referring a table data or a function in which a relationship between the angle differential value of inductance of αβ-axis Lα, Lβ, Lαβ and the rotational angle is preliminarily set, the torque estimation unit 36 calculates the angle differential value of inductance of αβ-axis Lα, Lβ, Lαβ corresponding to the present rotational angle.

3. Embodiment 3

Next, the controller for motor 30 according to Embodiment 3 will be explained. The explanation for constituent parts the same as those in Embodiment 1 will be omitted. The basic configuration of the controller for motor 30 according to the present embodiment is the same as that of Embodiment 1; however, the configuration of the pulsation extraction unit 37 and the pulsation control unit 38 is different from that of Embodiment 1.

Figure 7:
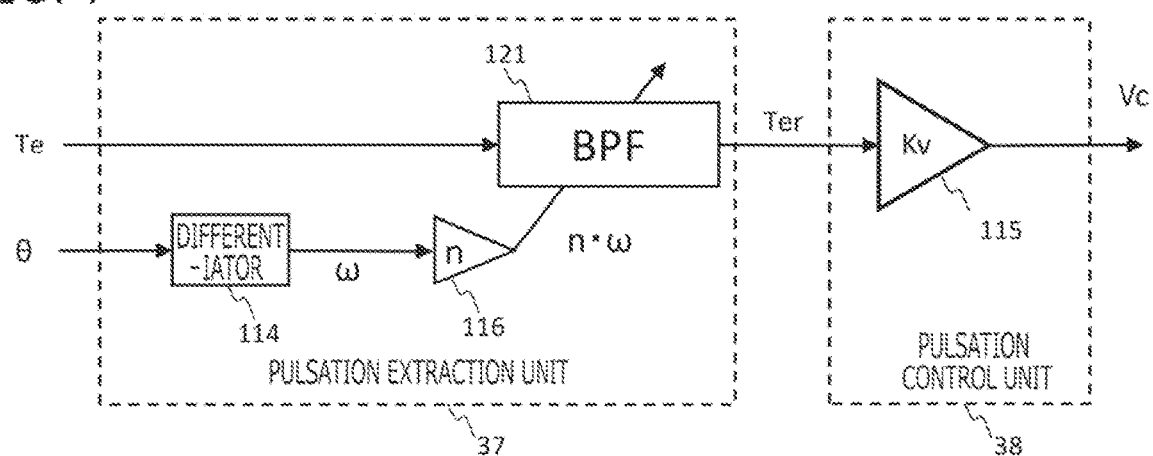
FIG. 7 is a time chart for explaining the reduction effect of the torque ripple component according to Embodiment 3.

In the present embodiment, as shown in FIG. 7, the pulsation extraction unit 37 calculates a value obtained by performing a band pass filter processing to the estimation value of output torque Te, as the extraction value of the pulsation component Ter. The band pass filter processing passes the component of the pulsation frequency of the preliminarily set rotation order n, and attenuates components other than the pulsation frequency of the rotation order n. The pulsation control unit 38 calculates the voltage command correction value Vc by multiplying the control gain Kv to the extraction value of the pulsation component Ter.

FIG. 7 will be explained in detail. The rotational angle θ is inputted into a differentiator 114, and the rotational angle speed ω is calculated. The output value (the rotational angle speed ω) of the differentiator 114 is inputted into a gain 116 which is set to the rotation order n, and the rotational angle speed ω is multiplied by n. n times value of the rotational angle speed nω is inputted into a band pass filter (BPF) 121, and it is set as a passing frequency of the band pass filter 121. The estimation value of output torque Te is inputted into the band pass filter (BPF) 121, the band pass filter processing is performed to the estimation value of output torque Te, and the torque ripple component Ter is outputted. Then, the torque ripple component Ter is inputted into a gain 115 which is set to the control gain Kv, the torque ripple component Ter is multiplied by the control gain Kv, and the voltage command correction value Vc is calculated.

Even in the present embodiment, similar to Embodiment 1, the pulsation component of the rotation order n can be extracted certainly, and the noise can be reduced. The noise reduction amount can be adjusted by the characteristics design of the band pass filter. Therefore, the torque ripple can be suppressed up to sufficient high frequency, without amplifying unnecessary noise and vibration.

4. Embodiment 4

Next, the controller for motor 30 according to Embodiment 4 will be explained. The explanation for constituent parts the same as those in Embodiment 1 will be omitted. The basic configuration of the controller for motor 30 according to the present embodiment is the same as that of Embodiment 1; however, the configuration of the pulsation control unit 38 is different from that of Embodiment 1.

In the present embodiment, the pulsation control unit 38 calculates a control value of cosine wave Ua by performing a control calculation based on the Fourier coefficient an of cosine wave; calculates a cosine wave multiplication value Ya by multiplying a cosine wave of the pulsation frequency of the rotation order n to the control value of cosine wave Ua; calculates a control value of sine wave Ub by performing a control calculation based on the Fourier coefficient bn of sine wave; calculates a sine wave multiplication value Yb by multiplying a sine wave of the pulsation frequency of the rotation order n to the control value of sine wave Ub; and calculates a value obtained by totaling the cosine wave multiplication value Ya and the sine wave multiplication value Yb, as the voltage command correction value Vc.

Even in the present embodiment, similar to Embodiment 1, the pulsation control unit. 38 calculates the phase delay Δθd due to calculation delay, based on the rotational angle θ of the motor, and calculates the cosine wave and the sine wave of the pulsation frequency of the rotation order n in which the phase delay Δθd is compensated.

Figure 8:
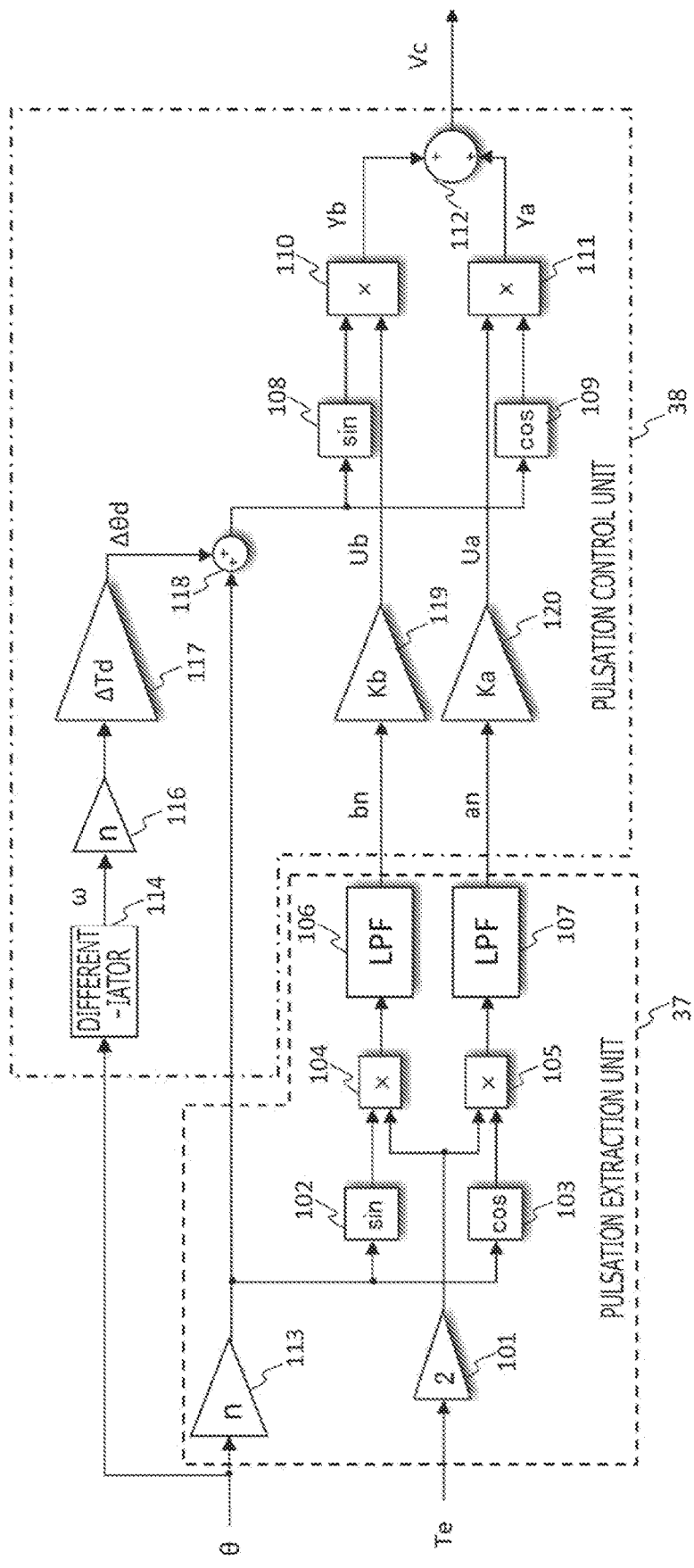
FIG. 8 is a time chart for explaining the reduction effect of the torque ripple component according to Embodiment 4.

FIG. 8 will be explained in detail. Since the configuration of the pulsation extraction unit. 37 is the same as that of Embodiment 1 of FIG. 4, explanation is omitted. Similar to Embodiment 1, the rotational angle θ is inputted into a differentiator 114, and the rotational angle speed ω is calculated. The output value (the rotational angle speed ω) of the differentiator 114 is inputted into a gain 116 which is set to the rotation order n, and the rotational angle speed ω is multiplied by n. The output value (n times value of the rotational angle speed nω) of the gain 116 is inputted into a gain 117 which is set to a dead time ΔTd due to calculation delay, and a multiplication processing of the dead time ΔTd is performed to the n times value of the rotational angle speed nw.

The output value (the n times value of the rotational speed nθ) of the gain 113 and the output value (the phase delay Δθd) of the gain 117 are inputted into an adder 118, the phase delay nθd is added to the rotational angle nθ of the rotation order n, and a rotational angle of the rotation order n after phase delay compensation is calculated. By addition of this phase delay Δθd, the phase is advanced by the phase delay Δθd and the phase delay is compensated.

The output value (the rotational angle of the rotation order n after phase delay compensation) of the adder 118 is inputted into a sine function 108, and a sine wave of the rotation order n after phase delay compensation is calculated. The output value of the adder 118 is inputted into a cosine function 109, and a cosine wave of the rotation order n after phase delay compensation is calculated.

In the present embodiment, the control calculation in the pulsation control unit 38 is set to a proportional calculation. The Fourier coefficient an of cosine wave is inputted into a gain 120 which is set to a proportional gain Ka of cosine wave, and the Fourier coefficient an of cosine wave is multiplied by the proportional gain Ka. The Fourier coefficient bn of sine wave is inputted into a gain 119 which is set to a proportional gain Kb of sine wave, and the Fourier coefficient bn of sine wave is multiplied by the proportional gain Kb. The control calculation in the pulsation control unit 38 may be set to any control calculation other than the proportional calculation, for example, a proportional integral calculation. In the case of the proportional integral calculation, an integrator is added in parallel with each of the gains 119, 120.

The output value (the sine wave) of the sine function 108 and the output value of the gain 119 are inputted into a multiplier 110, a multiplication processing of two input values is performed, and the sine wave multiplication value Yb is calculated. The output value (the cosine wave) of the cosine function 109 and the output value of the gain 120 are inputted into a multiplier 111, a multiplication processing of two input values is performed, and the cosine wave multiplication value Ya is calculated. Then, the output value (the sine wave multiplication value Yb) of the multiplier 110 and the output value (the cosine wave multiplication value Ya) of the multiplier 111 are inputted into an adder 112, and an addition value of two input values is outputted as the voltage command correction value Vc.

Like the example of FIG. Q, when setting the control calculation of the pulsation control unit 38 to the proportional calculation, it becomes a processing equivalent to Embodiment 1. When setting the control calculation of the pulsation control unit 38 to the proportional integral calculation, since an amplification factor can be increased until the torque ripple component becomes 0 by the integral calculation, the magnitude of steady torque ripple can be made smaller.

OTHER EMBODIMENTS

In each embodiment mentioned above, the superimposing unit 39 superimposes the voltage command correction value Vc only to the voltage command basic value of q-axis Vq0. However, the superimposing unit 39 may superimpose the correction value also to the voltage command basic value of d-axis Vd0. Since normally, the voltage command of q-axis has a high contribution to torque, it is simpler to superimpose only on the voltage command of q-axis. About a motor with large reluctance torque, the voltage command correction value Vc may be distributed to a correction value of d-axis by a ratio of the reluctance torque to the total torque, and may superimpose the correction value of d-axis on the voltage command basic value of d-axis Vd0. In this case, the torque ripple can, be reduced and the similar effect as each embodiment can be obtained.

In each embodiment mentioned above, it is the control system which calculates the voltage command in the coordinate system of dq-axis. For example, it may be a control system which calculates the voltage command in the coordinate system of $\alpha\beta$-axis, or the coordinate system of UVW-phase. In this case, the voltage command correction value is treated as a value of the coordinate system of dq-axis, and the voltage command correction value is converted into the voltage command correction value in the coordinate system of $\alpha\beta$-axis, or the coordinate system of UVW-phase by coordinate conversion, and the converted value is superimposed on the voltage command of each coordinate system. In this case, the similar effect as each embodiment can be obtained.

The controller for motor of each embodiment mentioned above may be applied to the controller for electric power steering which assists steering of vehicle. In this case, since the torque ripple of motor is reduced and the unnecessary noise and vibration are not amplified, the noise and the pulsation of handle which the driver of the vehicle feels can be made small.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

20 Inverter, 25 DC Power Source, 30 Controller for Motor, 31 Current Detection Unit, 32 Rotation Detection Unit, 33 Voltage Detection Unit, 34 Basic Voltage Command Calculation Unit, 35 Magnetic Flux Estimation Unit, 36 Torque Estimation Unit, 37 Pulsation Extraction Unit, 38 Pulsation Control Unit, 39 Superimposing Unit, 40 Voltage Application Unit, $I\alpha\beta$ $\alpha\beta$-axis current detection value, Idq dq-axis current detection value, Kv Control gain, Te Estimation value of output torque Vc Voltage command correction value, Vdq0 dq-axis voltage command basic value, Ya Cosine wave multiplication value, Yb Sine wave multiplication value, Yab Total value, Ua Control value of cosine wave, Ub Control value of sine wave, an Fourier coefficient of cosine wave, bn Fourier coefficient of sine wave, n Rotation order, $\Phi\alpha\beta$ Estimation value of $\alpha\beta$-axis interlinkage flux, $\Phi$dq Estimation value of dq-axis interlinkage flux, $\theta$ Rotational Angle

What is claimed is:

1. A controller for motor comprising at least one processor configured to implement:
a basic voltage command calculator that calculates a voltage command basic value;
a current detector that detects a current flowing through a winding of a motor;
a magnetic flux estimator that estimates an interlinkage flux interlinked to the winding, based on an applied voltage applied to the winding and a detection value of the current;
a torque estimator that estimates an output torque of the motor, based on the detection value of the current and an estimation value of the interlinkage flux;
a pulsation extractor that extracts a pulsation component from an estimation value of the output torque;
a pulsation controller that calculates a voltage command correction value, based on an extraction value of the pulsation component;
a superimposer that calculates a voltage command after superimposing by superimposing the voltage command correction value on the voltage command basic value; and
a voltage applicator that applies voltage to the winding, based on the voltage command after the superimposing,
wherein the pulsation extractor calculates Fourier coefficients of a cosine wave and a sine wave by Fourier-transforming the estimation value of the output torque at a pulsation frequency of a preliminarily set rotation order, based on a rotational angle of the motor, and calculates the Fourier coefficients of the cosine wave and the sine wave, as the extraction value of the pulsation component,
wherein the pulsation controller calculates a cosine wave multiplication value by multiplying a cosine wave of the pulsation frequency of the rotation order to the Fourier coefficient of the cosine wave, calculates a sine wave multiplication value by multiplying a sine wave of the pulsation frequency of the rotation order to the Fourier coefficient of the sine wave, and calculates a value obtained by multiplying a control gain to a total value of the cosine wave multiplication value and the sine wave multiplication value, as the voltage command correction value, and wherein the pulsation controller calculates a phase delay due to calculation delay, based on the rotational angle of the motor, and calculates the cosine wave of the pulsation frequency of the rotation order and the sine wave of the pulsation frequency of the rotation order in which the phase delay is compensated.

2. The controller for motor according to claim 1, wherein the pulsation extractor extracts a component of a pulsation frequency of a preliminarily set rotation order from the estimation value of the output torque.

3. The controller for motor according to claim 1, wherein the magnetic flux estimator calculates the estimation value of the interlinkage flux, based on an integral value of the applied voltage and an integral value of the detection value of the current.

4. The controller for motor according to claim 1, wherein the torque estimator calculates the estimation value of the output torque, based on a multiplication value of the estimation value of the interlinkage flux and the detection value of the current.

5. The controller for motor according to claim 1, wherein the torque estimator calculates the estimation value of the output torque, based on a multiplication value of the detection value of the current and a differential value obtained by differentiating the estimation value of the interlinkage flux by the rotational angle.

6. The controller for motor according to claim 1, wherein the basic voltage command calculator calculates a voltage command basic value of d-axis and a voltage command basic value of q-axis, as the voltage command basic value, and wherein the superimposer calculates a voltage command of q-axis after superimposing by superimposing the voltage command correction value on the voltage command basic value of q-axis, and sets the voltage command basic value of d-axis as a voltage command of d-axis after superimposing as it is.

7. A controller for motor comprising at least one processor configured to implement:

a basic voltage command calculator that calculates a voltage command basic value;

a current detector that detects a current flowing through a winding of a motor;

a magnetic flux estimator that estimates an interlinkage flux interlinked to the winding, based on an applied voltage applied to the winding and a detection value of the current;

a torque estimator that estimates an output torque of the motor, based on the detection value of the current and an estimation value of the interlinkage flux;

a pulsation extractor that extracts a pulsation component from an estimation value of the output torque;

a pulsation controller that calculates a voltage command correction value, based on an extraction value of the pulsation component;

a superimposer that calculates a voltage command after superimposing by superimposing the voltage command correction value on the voltage command basic value; and a voltage applicator that applies voltage to the winding, based on the voltage command after the superimposing, wherein the pulsation extractor calculates Fourier coefficients of a cosine wave and a sine wave by Fourier-transforming the estimation value of the output torque at a pulsation frequency of a preliminarily set rotation order, based on a rotational angle of the motor, and calculates the Fourier coefficients of the cosine wave and the sine wave, as the extraction value of the pulsation component, wherein the pulsation controller calculates a control value of cosine wave by performing a control calculation based on the Fourier coefficient of the cosine wave, calculates a cosine wave multiplication value by multiplying a cosine wave of the pulsation frequency of the rotation order to the control value of cosine wave, calculates a control value of sine wave by performing a control calculation based on the Fourier coefficient of the sine wave, calculates a sine wave multiplication value by multiplying a sine wave of the pulsation frequency of the rotation order to the control value of sine wave, and calculates a value obtained totaling the cosine wave multiplication value and the sine wave multiplication value, as the voltage command correction value, and wherein the pulsation controller calculates a phase delay due to calculation delay, based on the rotational angle of the motor, and calculates the cosine wave of the pulsation frequency of the rotation order and the sine wave of the pulsation frequency of the rotation order in which the phase delay is compensated.

\* \* \* \* \*